United States Patent [19]
Nakamura

[11] Patent Number: 4,864,641
[45] Date of Patent: Sep. 5, 1989

[54] RADIO DATA TRANSMISSION SYSTEM

[75] Inventor: Nobuhiro Nakamura, Hyogo, Japan

[73] Assignee: Mitsubishi Denki Kabushiki Kaisha, Tokyo, Japan

[21] Appl. No.: 137,744

[22] Filed: Dec. 24, 1987

[30] Foreign Application Priority Data

Feb. 16, 1987 [JP] Japan .................................. 62-32733

[51] Int. Cl.$^4$ .............................................. H04B 1/06
[52] U.S. Cl. .................................. 455/276; 455/277; 455/278; 375/100
[58] Field of Search ...................... 455/133, 10, 11, 52, 455/55, 275–278, 280, 281; 375/94, 100

[56] References Cited

U.S. PATENT DOCUMENTS

| | | | |
|---|---|---|---|
| 4,143,369 | 3/1979 | Ayers | 455/277 |
| 4,370,522 | 1/1983 | Takeda et al. | 455/277 |
| 4,525,869 | 6/1985 | Hamada et al. | 455/277 |
| 4,611,334 | 9/1986 | Engel et al. | 375/100 |
| 4,696,058 | 9/1987 | Tachita et al. | 455/277 |
| 4,733,402 | 3/1988 | Monsen | 375/100 |
| 4,756,023 | 7/1988 | Kojima | 455/277 |

OTHER PUBLICATIONS

F. Adachi et al., "A Periodic Switching Diversity Technique for a Digital FM Land Mobile Radio", 1978, IEEE, pp. 211–219.

Primary Examiner—Robert L. Griffin
Assistant Examiner—Curtis Kontz
Attorney, Agent, or Firm—Bernard, Rothwell & Brown

[57] ABSTRACT

A radio data transmission system wherein signals received via a plurality of diversity antennas are switched at a cycle of subtime slot so that, when the reception level of at least one antenna is sufficiently high to receive the required signal in the relevant time slot, the digital signal in that time slot can be detected properly even if the reception level of any other antenna is not sufficiently high. Accordingly, the code error rate can be minimized by constituting the system in such a manner that the correlation of variations in the reception levels of the diversity antennas becomes extremely low.

7 Claims, 6 Drawing Sheets

RADIO DATA TRANSMISSION SYSTEM

BACKGROUND OF THE INVENTION

1. Field of the Invention

The present invention relates to radio communication and, more particularly to a radio data transmission system having great effects in application to vehicle or similar mobile radio communication where a problem of complicated reflected waves is existent.

2. Description of the Prior Art

In the mobile radio communication, input waves are in most cases composed of reflected waves from various buildings and so forth. And both the amplitude and the phase of the received waves, which are composite signals of such reflected waves, are varied intricately in accordance with movement of a mobile station.

FIGS. 1 and 2 illustrate how such variations are caused. In FIG. 1 are shown a base station S, a mobile station M, two reflection points R1 and R2, and two different wave routes a and b. Represented by Ea and Eb are the amplitudes of input waves received respectively from the route a via the reflection point R1 and the route b via the reflection point R2. Since the reflection points R1 and R2 are shifted with movement of the mobile station M, the phases of the input waves received via the routes a and b respectively are also changed to consequently cause variations in both amplitude and phase of the composite waves as shown by waveforms (A) and (B) in FIG. 2. During an interval III in FIG. 2, Ea and Eb are substantially equal to each other in relative amplitude and are substantially opposite to each other in relative phase. (For convenience of explanation, such interval is chosen as III.) Therefore the composite amplitude is widely varied to eventually bring about a sharp variation in the composite phase, hence inducing inversion thereof. During intervals I and II anterior and posterior respectively to such variation, there occurs relatively small variation in both amplitude and phase.

In phase modulation digital communication where data is transmitted on the basis of a phase difference obtained with reference to the phase of a preceding bit, if the amplitude and the phase of the received composite signal is sharply varied as shown in the interval III, it becomes difficult to detect the phase difference from the preceding bit, hence inducing ready generation of code error. Such sharp variations of the amplitude and the phase occur substantially at every half wavelength in most cases although being dependent also on the positional relationship between the reflection points R1, R2 and the mobile station M. For example, under the conditions including a vehicle speed of 40 km/hr and a frequency of 900 MHz (half wavelength about 17 cm), it follows that sharp amplitude and phase variations occur substantially at every 15 msec ($\approx 17/40 \times 10^5 \times 1/60 \times 60$). Supposing now the length of interval III is at a ratio of about 1/10 to the entirety, data of 1.5 msec fails to be transmitted properly to generate extremely great code error as a result. In order to eliminate such a problem, it has been customary heretofore to form an error correction code of a high redundancy so that any error resulting from some data dropouts can be corrected.

In the conventional radio data transmission system where it is inevitable to use such error correction code of an extremely high redundancy as mentioned, the rate of the essential transmission data is low in the gross content and therefore the data transmission speed is obliged to be considerably lowered due to the restriction of radio frequency assignment. In addition, there are further problems in practical use including the necessity of a large-sized and complicated decoding apparatus.

SUMMARY OF THE INVENTION

The present invention has been accomplished in an attempt to solve the problems mentioned. And its object resides in providing an improved system which eliminates any code error resulting from the aforesaid sharp amplitude and phase variation and is capable of performing desired data transmission by the use of radio circuits without the necessity of any complicated and large error correction code.

For the purpose of achieving the above object, the radio data transmission system according to one aspect of the present invention is so contrived that one time slot T of digital signal is divided into a plurality of subtime slots, and a plurality of diversity receiving antennas are installed, wherein the input signals are selectively received in high-speed synchronism in such a manner that the signal obtained via the first antenna is fed to a receiving circuit during the first subtime slot while the signal obtained via the second antenna is fed thereto during the second subtime slot.

PREFERRED EMBODIMENT OF THE INVENTION

Figure 1:
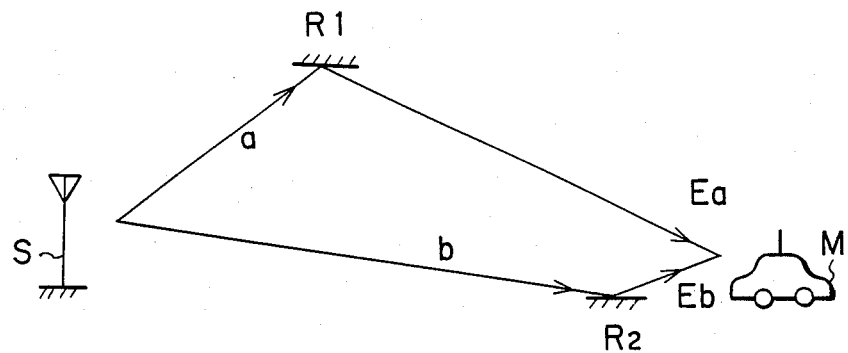
FIG. 1 illustrates routes of interference waves in mobile radio communication.
Figure 2:
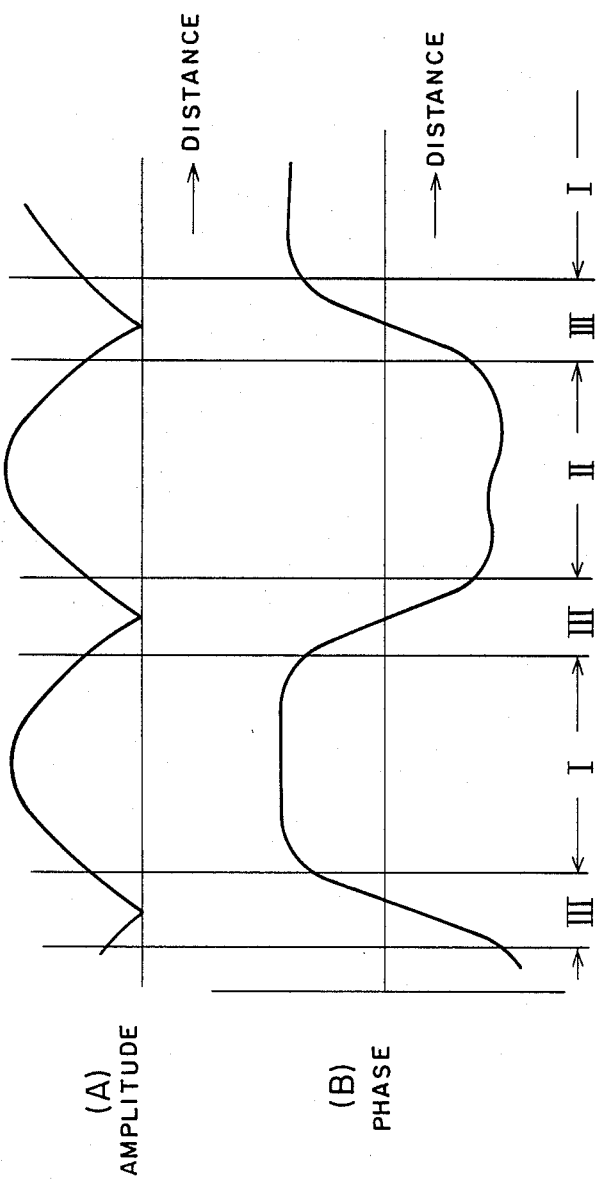
FIG. 2 graphically shows the relationship between the amplitude and the phase of the interference waves in FIG. 1.
Figure 3:
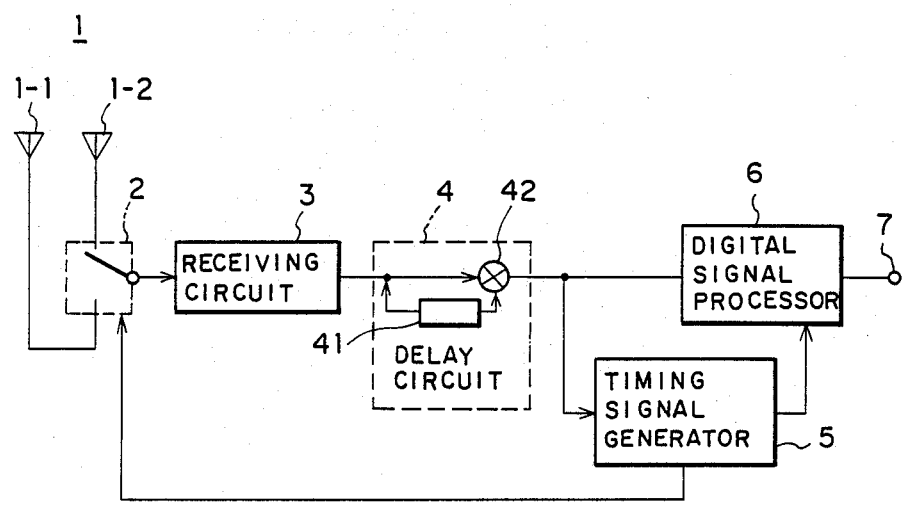
FIG. 3 is a block diagram of an exemplary radio data transmission system embodying the present invention.

Hereinafter an exemplary embodiment of the present invention will be described in detail with reference to the accompanying drawings. FIG. 3 is a block diagram of a radio data transmission system according to the present invention. Denoted by 1 is a diversity receiving antenna which, in this embodiment, is constituted of a first antenna 1-1 and a second antenna 1-2. There is provided an antenna switching circuit 2 for selectively switching signals from the two antennas at a high speed per half period of one time slot T (hereinafter such half period will be referred to as "subtime slot" in this embodiment) and introducing the signal obtained from each antenna per time slot to a receiving circuit 3 in the following stage. The receiving circuit 3 comprises a high-frequency amplifier, a frequency converter, an intermediate frequency amplifier and a baseband signal demodulator, wherein the radio frequency signal introduced from the antenna 1 is converted into a baseband signal. Denoted by 4 is a delay detection circuit comprising a delay circuit 41 for causing a delay T of one time slot and a phase detector 42. In the circuit 4, the baseband signal corresponding to the digital signal in the present time slot is phase-compared with the baseband signal corresponding to the digital signal in the preceding time slot, whereby the digital data transmitted in the form of phase modulated data is detected. Further shown is a timing signal generator 5 which samples the duration data of one time slot from the output data of the delay detection circuit 4 to produce time data of a subtime slot duration and feeds it to the antenna switching circuit 2. A digital signal processor 6 is provided for executing the required signal process on the basis of the output of the delay detection circuit 4 and the signal obtained from the timing signal generator 5 and thereby producing data of a desired form from an output terminal 7.

Now the operation performed in the above system will be described below with reference to FIG. 4 and FIG. 5. The first antenna 1-1 receives a signal SA via a first route, while the second antenna 1-2 receives a signal SB via a second route. In order to enhance the diversity effect, the two antennas are devised in such construction to minimize the correlation between the reception level variation characteristics thereof, for example, the construction in which horizontal and vertical positions of installation, directivity, and/or polarization etc. are varied.

Figure 4:
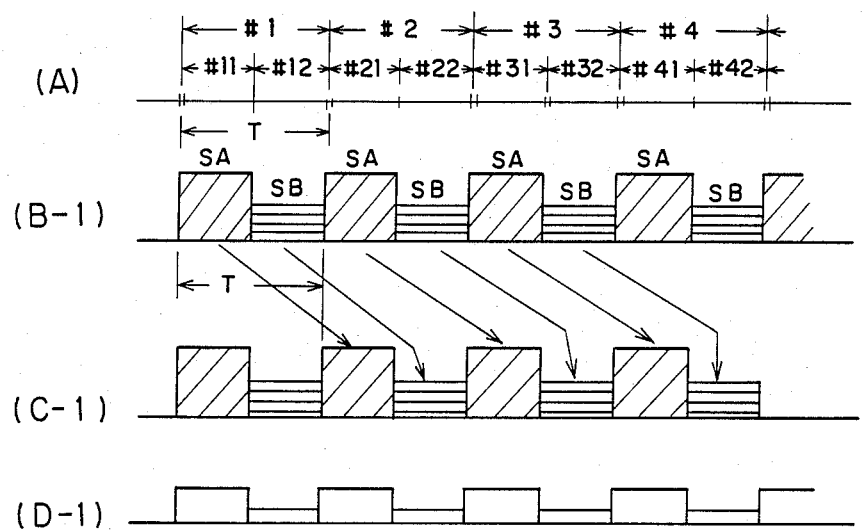
FIGS. 4 and 5 illustrate how an operation is performed in the system of FIG. 3, in which (A) represents the relation of time slots (where #n stands for an nth time slot, and #ni for an ith subtime slot in the nth time slot), (SA) is an output signal of a first antenna, (SB) is an output signal of a second antenna, (B-1) is an output signal of an antenna switching circuit obtained when the first and second antennas are switched over by the antenna switching circuit per half time slot, (B-2) represents a case where the antenna switchover timing has a deviation from the time slot switchover point, (D-1) and (D-2) represent demodulation outputs.
Figure 5:
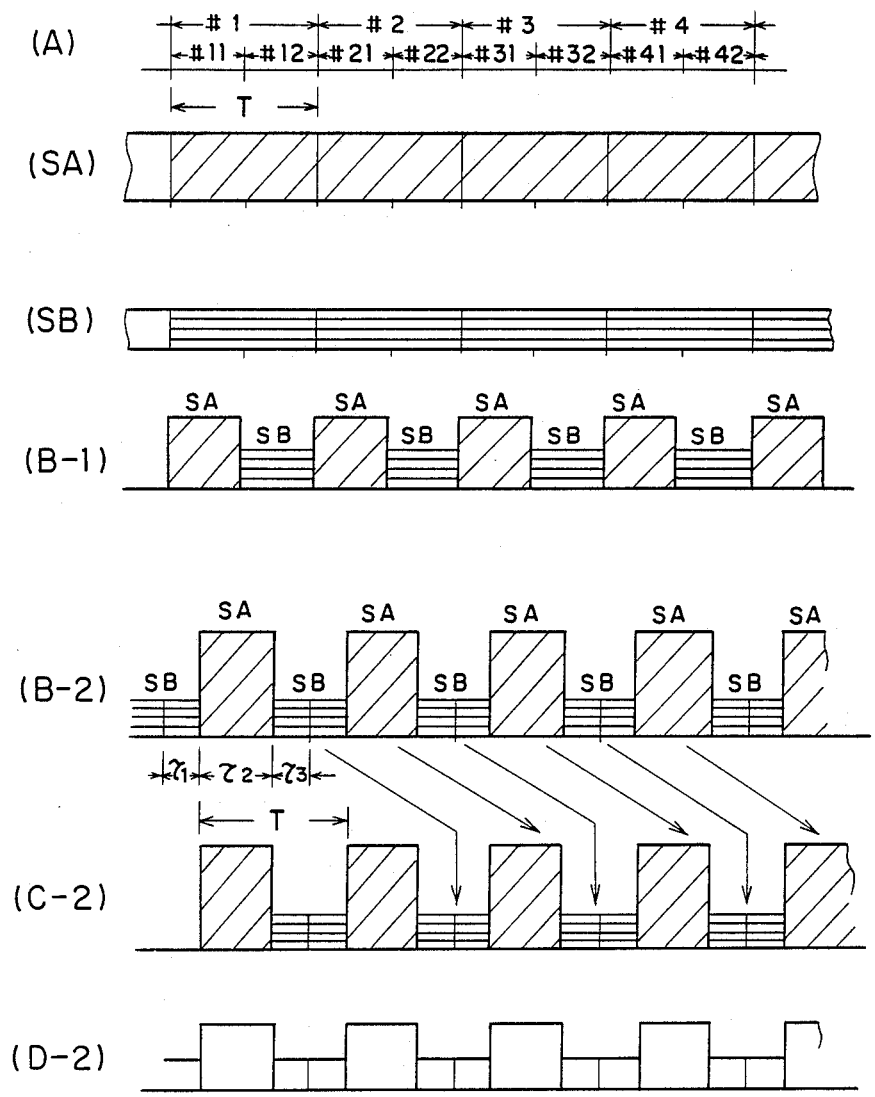

The signals thus obtained from the antennas 1-1 and 1-2 are fed to the receiving circuit 3 while being switched per half time slot synchronously with each of half durations [#11, #12, #21, #22 and so forth in FIG. 4 (A) and FIG. 5 (A)]of the digital signal time slots [#1, #2 and so forth in FIG. 4 (A) and FIG. 5 (A)]. In this arrangement, the signal SA from the first antenna and the signal SB from the second antenna are fed alternately during each half time slot to the receiving circuit 3, as shown in FIG. 4 (B-1). A signal obtained by passing such signal through the delay circuit 41 of the delay detector 4 is shown in FIG. 4 (C-1), and the phase detector 42 performs differential phase detection between the delayed signal and the signal SA from the first antenna 1-1 and also between the delayed signal and the signal SB from the second antenna 1-2.

When the output signal of the receiving circuit 3 is processed by the delay detection circuit 4, the signal SA from the first antenna 1-1 is differentially detected in comparison with the signal delayed therefrom for one time slot, and also the signal SB from the second antenna 1-2 is differentially detected in comparison with the signal delayed therefrom for one time slot. Such detection is typically shown in FIG. 4 (D-1).

The signal SA from the first antenna 1-1 and the signal SB from the second antenna 1-2 are the same digital data merely with exception of the routes. And in the radio data transmission system which transmits normal slow digital signals, the time difference between the signals received respectively via the first route and the second route is sufficiently shorter than the time slot duration as will be described later, so that the overlap of the two signals is extremely small.

Consequently, even if any phase difference is caused in the signals received respectively via the first and second routes due to the difference between the lengths of the routes, there exists no harmful influence with respect to the delay detection. Furthermore, the use of diversity antennas brings about an advantage that if the output of one antenna is low, the output of another antenna is sufficiently high so that required signal detection can be performed properly.

An example of time difference in slow data transmission is as follows:

At a data transmission speed of 3 kbps (one time slot duration $=333$ $\mu$sec), the time difference between a slot duration $=333$ $\mu$sec), signal received directly and a signal received via a route with one reflection (route length 15 km, azimuth deviation 30°) is calculated as follows. Since the route length difference is 15 km $(1-\cos 30°)=2$ km, the time difference is 6.7 $\mu$sec. Therefore, the rate of the time difference in one time slot resulting from the route length difference is $6.7/333=0.021$ approx. 2%). Thus, the overlap of the signals is about 2%.

In case the switchover timing of the antenna switching circuit 2 fails to coincide with the time slot switchover point, the output signal of the antenna switching circuit 2 becomes such as shown in FIG. 5 (B-2), so that the signal from one antenna is varied in its duration. In this case also, phase detection is executed with a corresponding slot-time delay signal of FIG. 5 (C-2) produced in the delay detection circuit 4, so that the signal SA received via the first antenna 1-1 and the signal SB received via the second antenna 1-2 are differentially detected in comparison with such delay signal respectively as shown in FIG. 5 (D-2). Consequently, with regard to the phase detection based on the signal having a shift of one time slot from the signal via the same route, the switchover timing deviation brings about no impediment at all. In FIG. 5 (B-2), $\tau_2$ represents a period during which the signal SA from the first antenna is selectively connected and introduced, and each of $\tau_1$ and $\tau_3$ represents a period during which the signal SB from the second antenna is selectively connected and introduced. And the delay detection output signal thus obtained is processed by the timing signal generator 5 to produce an antenna switching signal. In order to execute signal processing in a desired mode, the digital signal processor 6 functions to produce digital data from its output terminal 7.

Figure 6:
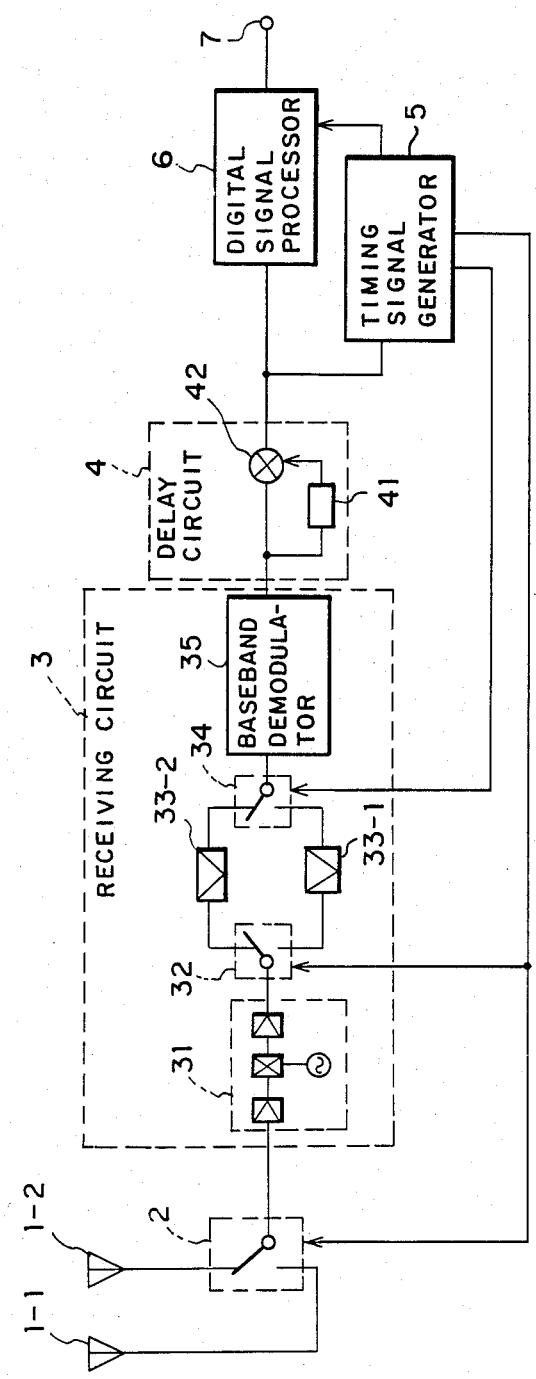
FIG. 6 is a block diagram of another exemplary embodiment of the present invention.
Figure 7:
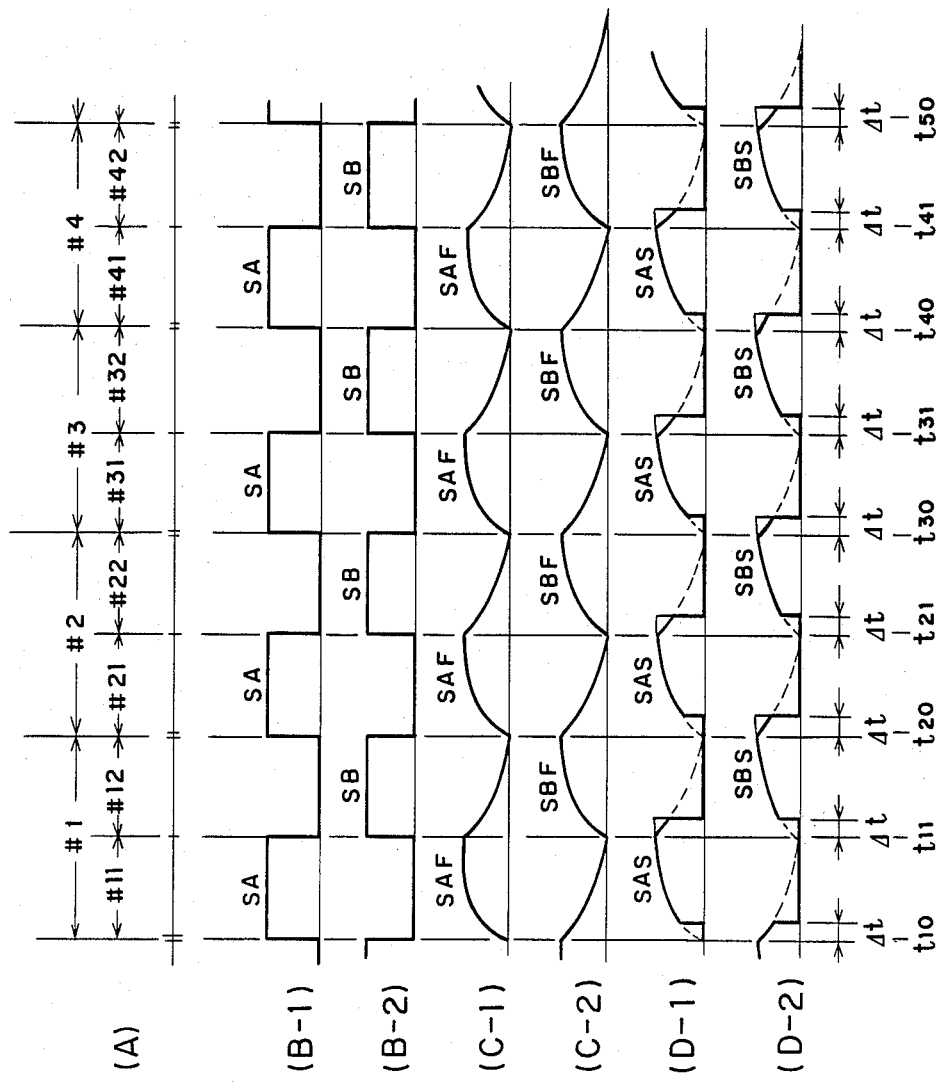
FIG. 7 illustrates how an operation is performed in the embodiment of FIG. 6.

The operation mentioned above is based on the premise that the pass bandwidth of the receiving circuit 3 is designed to be sufficiently greater than the bandwidth of the digital signal to be transmitted, and the signals from the two antennas 1-1 and 1-2 are demodulated without mutual interference, whereby the respective baseband signals SA and SB are introduced to the delay detection circuit 4 as shown in FIG. 4. However, if the bandwidth of the receiving circuit 3 is narrowed to be close to the bandwidth included in only main energy of the digital signal for the purpose of preventing interference caused by mixture of signals from some other station, the signals from the first antenna 1-1 and the second antenna 1-2 are mixed in the receiving circuit 3 with each other at the respective rise and fall portions due to switchover of the antennas, so that it becomes impossible to perform the simple differential delay detection between the signals SA and also between the signals SB described previously with reference to FIG. 4. Since such method of reception is based on the premise that the signal received from the first antenna 1-1 and the signal from the second antenna 1-2 mutually have a low correlation, if the baseband signals are demodulated in such mixed state, there occurs a sharp phase shift around the mixed portion to consequently generate noise which deteriorates the code error rate of the digital signal. In an attempt to accomplish the object of the present invention with solution of such a problem, the present inventor has contrived a novel constitution which will be described below with reference to a block diagram of FIG. 6 showing a receiving system and a signal waveform chart of FIG. 7 illustrating the operation thereof. The essential point resides in that the signals received respectively from the first antenna 1-1 and the second antenna 1-2 are passed through first and second narrow band filters 33-1 and 33-2 in such a manner as not to be mixed with each other, then the outputs therefrom are selectively switched by a second switch 34 and are fed to a demodulator 35 which demodulates the baseband signal.

Hereinafter the operation will be described. The antenna switching circuit 2 is actuated by the timing signal obtained from the timing signal generator 5, so that the signal SA from the first antenna 1-1 and the signal SB from the second antenna 1-2 are introduced during every half slot time as shown in FIG. 7 (B-1) and FIG. 7 (B-2) respectively. In FIG. 7 (A), #1 through 4 denote a time slot numbers, and each of #11, #12, #21, #22, #31, #32, #41 and #42 denotes a half time slot in each time slot. The signals SA and SB are converted into intermediate frequency signals of a required level by the amplifier/converter 31 which performs high frequency amplification, frequency conversion and intermediate frequency amplification. The signal pass characteristic anterior to this stage is designed to provide a relatively wide bandwidth so as not to raise any problem with respect the overlap of the signals SA and SB at the antenna switching point. Subsequently, through first and second filter switches 32 and 34 controlled by the timing signal obtained from the aforesaid timing circuit 5, the signal from the first antenna and the signal from the second antenna are selectively switched per half time slot by the first filter switch 32 and are introduced respectively to the first filter 33-1 and the second filter 33-2. The signals thus filtered are taken out by time sharing means and then are fed to the demodulator 35. In the outputs of the first bandpass filter 33-1 and the second bandpass filter 33-2 each designed to have a narrow bandwidth, the signal passed therethrough rises with a delay in the leading edge and falls with a delay in the trailing edge as shown in FIG. 7 (C-1) and FIG. 7 (C-2) wherein SAF and SBF represent the filtered signals SA and SB respectively.

In order to avoid mutual mixing of the rise and fall portions of the signals SA and SB, the two signals are alternately switched by the second filter switch 34 and then are fed to the baseband demodulator 35, where the signals SA and SB of every half time slot are demodulated without any mutual mixing. In FIG. 7 (D-1) and FIG. 7 (D-2), SAS and SBS represent the signals SA and SB respectively in the output of the second filter switch 34. With respect to the antenna switching circuit 2 and the first filter switch 32, the switchover timing is synchronized with the switching point tij of each half time slot. Meanwhile the second filter switch 34 is so contrived that, in view of the positional deviation of the signals SA and SB caused on the time base thereof due to the rise and fall delay through the narrow band filter, the switching action is performed with a delay $\Delta t$ from the switching point tij of each half time slot so that the output is maximized.

The description given hereinabove is concerned with an exemplary case where digital data is transmitted corresponding to the phase of the baseband signal or to the phase variation thereof. However, the present invention is applicable also to digital data transmission of another mode in which the phase of a radio transmission carrier is changed digitally. In the latter case, the baseband demodulator 35 is not required, but the phase difference between two signals caused in the phase detector 42 of the delay detection circuit 4 may become great due to the frequency error in the frequency conversion of the amplifier/converter 31. Therefore it is necessary to make proper correction for eliminating deterioration of the eye pattern. For example, correction is executed to eliminate the signal frequency error of the amplifier/converter 31 so that the phases of the two signals fed to the phase detector 42 can be maintained in a proper relationship, hence averting deterioration of the eye pattern.

In the above embodiment, an explanation has been given relative to an example of switching two antennas. However, the constitution may be so modified that a greater number of antennas are installed and switched a plurality of times within one time slot, so that the correlation among the antennas is reduced to consequently enhance the diversity effect.

According to the present invention, as described hereinabove, signals from diversity receiving antennas are switched per 1/n time slot (n: integer greater than 1) and are differentially detected to extract the original digital signal. Thus, there is attained a remarkable advantage of achieving diversity effect automatically without the necessity of received signal comparison and switchover which are usually required in ordinary diversity reception.

What is claimed is:

1. A receiver system for receiving signals from a radio data transmission system in which baseband signals are phase modulated with digital information in each of a plurality of time slots, converted into radio frequency signals, and transmitted via at least two transmission paths having substantially different transmission lengths, comprising:
   (a) a plurality n (integer greater than 1) of receiving antennas having a mutually low correlation of reception;
   (b) an antenna switching circuit for switching a received signal from among each of said receiving antennas at a cycle of 1/n of each time slot and outputting signals from each of the antennas alternately;
   (c) a receiving circuit for amplifying and demodulating a plurality n of output signals from said antenna switching circuit, and converting said output signals into baseband signals;
   (d) a delay detection circuit for detecting the phase differential of said baseband signals from said receiving circuit through a delay circuit having a delay time equivalent to one time slot, and detecting the digital signals transmitted by said baseband signals; and
   (e) a timing signal generator circuit for extracting the digital information of each time slot from the output signal of said delay detection circuit, and controlling the switching action of said antenna switching circuit with 1/n duration of one time slot, wherein the digital data information is detected by introducing the transmitted signals in sequence through said plurality n of antennas during every 1/n time slot.

2. The system as defined in claim I, wherein the number n of antennas is two and said receiver system further comprises: an amplifier for amplifying in common the signals obtained from the two antennas by the switching action;

a first switch for switching the output of said amplifier synchronously with said antenna switching circuit and inputting the output signal of the first antenna to a first terminal while inputting the output signal of the second antenna to a second terminal;

a first narrow band filter for filtering in a narrow band area the signal fed to said first terminal;

a second narrow band filter for filtering in a narrow band area the signal fed to said second terminal;

a second switch for switching the outputs of said first and second narrow band filters and supplying said outputs alternately at an output terminal; and a demodulator circuit for demodulating the output of said second switch and thereby demodulating the baseband signal.

3. The system as defined in claim 2, wherein the switchover timing of said second switch is delayed from that of said first switch corresponding to the delay time of said first and second narrow band filters.

4. A receiver system for receiving radio frequency signals from a radio data transmission system in which baseband signals are phase modulated with digital information in each of a plurality of time slots from at least two transmission paths having substantially different transmission lengths, comprising:

(a) a plurality n (integer greater than 1) of receiving antennas having a mutually low correlation of reception;

(b) an antenna switching circuit for switching a received signal from among each of said receiving antennas at a cycle of 1/n of each time slot and outputting signals from each of the antennas alternately;

(c) an amplifying and switching circuit for amplifying a plurality n of output signals from the antenna switching circuit and converting the frequencies of the signals into baseband frequencies;

(d) a delay detection circuit for detecting the phase differential of output signals of said amplifying and switching circuit through a delay circuit having a delay time equivalent to one time slot, and detecting the digital signals transmitted by said baseband signals; and (e) a timing signal generator circuit for extracting the digital information of each time slot from the output signal of said delay detection circuit, and controlling the switching action of said antenna switching circuit with 1/n duration of one time slot, wherein the digital data information is detected by introducing the transmitted signals in sequence through said plurality n of antennas during every 1/n time slot.

5. The system as defined in claim 4, wherein the number n of antennas is two and said receiver system further comprises:

an amplifier for amplifying in common the signals obtained from two antennas by the switching action;

a first switch for switching the output of said amplifier synchronously with said antenna switching circuit and outputting the output signal of the first antenna to a first terminal while outputting the output signal of the second antenna to a second terminal;

a first narrow band filter for filtering in a narrow band area the signal fed to said first terminal;

a second narrow band filter for filtering in a narrow band area the signal fed to said second terminal;

a second switch for switching the outputs of said first and second narrow band filters and supplying said outputs alternately to an output terminal; and a demodulator circuit for demodulating the output of said second switch and thereby demodulating the baseband signals.

6. The system as defined in claim 5, wherein the switchover timing of said second switch is delayed from that of said first switch corresponding to the delay time of said first and second narrow band filters.

7. The system as defined in claim 4 wherein a local transmitted frequency of the amplifying and switching circuit is corrected to maintain phases of two signals impressed against the delay detection circuit in a predetermined relationship.

* * * * *

UNITED STATES PATENT AND TRADEMARK OFFICE
CERTIFICATE OF CORRECTION

PATENT NO. : 4,864,641

DATED : September 5, 1989

INVENTOR(S) : NOBUHIRO NAKAMURA

It is certified that error appears in the above-identified patent and that said Letters Patent is hereby corrected as shown below:

Front Page, Col. 2, line 10, "Kontz" should be --Kuntz--.

Col. 3, line 20, "process" should be --processing--;
Col. 3, line 64, "mal" should be --mally--.

Col. 4, line 13, delete "slot";
Col. 4, line 14, delete "duration =333 μsec),";

Signed and Sealed this

Eighteenth Day of September, 1990

*Attest:*

HARRY F. MANBECK, JR.

*Attesting Officer*     *Commissioner of Patents and Trademarks*